(12) United States Patent
James et al.

(10) Patent No.: US 8,498,991 B2
(45) Date of Patent: Jul. 30, 2013

(54) NEIGHBORHOOD GUIDE FOR SEMANTIC SEARCH SYSTEM AND METHOD TO SUPPORT LOCAL POI DISCOVERY

(75) Inventors: Frances H. James, Sunnyvale, CA (US); John W. Suh, Palo Alto, CA (US); Timothy A. Musgrove, Morgan Hill, CA (US); Peter Ridge, San Jose, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 107 days.

(21) Appl. No.: 13/247,695

(22) Filed: Sep. 28, 2011

(65) Prior Publication Data

US 2012/0089615 A1    Apr. 12, 2012

Related U.S. Application Data

(60) Provisional application No. 61/390,476, filed on Oct. 6, 2010.

(51) Int. Cl.
*G06F 7/00* (2006.01)
*G06F 17/30* (2006.01)
*G01C 21/00* (2006.01)
*G01C 21/34* (2006.01)
*G08G 1/123* (2006.01)

(52) U.S. Cl.
USPC .......................................... 707/748; 701/426

(58) Field of Classification Search
None
See application file for complete search history.

(56) References Cited

U.S. PATENT DOCUMENTS 6,044,212 A * 3/2000 Flavin et al. ..................... 703/6
7,296,006 B2 * 11/2007 Flynn et al. ..................... 706/37

OTHER PUBLICATIONS

Howe, run time from FOLDOC Sep. 14, 2001, Free On-Line Dictionary of Computing, http://foldoc.org/run+time.*

* cited by examiner

*Primary Examiner* — Jason Liao
(74) *Attorney, Agent, or Firm* — John A. Miller; Miller IP Group, PLC

(57) ABSTRACT

A neighborhood guide system, related method and associated database for providing information about businesses and other locations to a vehicle driver, or other user, in a more natural and informative manner than traditional IVR systems. When interacting with the user, the neighborhood guide system typically will only provide choices for the user to select from based on a user request that are in the particular vicinity of the user. Further, the neighborhood guide system provides usable information about the selected business by the user, such as hours of operation, cost, ratings, parking, etc.

19 Claims, 4 Drawing Sheets

NEIGHBORHOOD GUIDE FOR SEMANTIC SEARCH SYSTEM AND METHOD TO SUPPORT LOCAL POI DISCOVERY

CROSS-REFERENCE TO RELATED APPLICATIONS

This application claims the benefit of the filing date of U.S. Provisional Patent Application No. 61/390,476, titled "Neighborhood Guide": Semantic Search System and Method to Support Local POI Discovery, filed Oct. 6, 2010.

BACKGROUND OF THE INVENTION

1. Field of the Invention

This invention relates generally to a neighborhood guide system and associated database for providing information about businesses and other places and, more particularly, to a neighborhood guide interactive voice response (IVR) system, related method and associated database for providing information about businesses and other places to a vehicle driver, or other user, in a more natural and informative manner than traditional IVR systems.

2. Discussion of the Related Art

Many vehicle manufacturers offer various types of navigation systems and driver assistance systems, referred to herein collectively and separately as interactive voice response (IVR) systems, where a vehicle driver can communicate with a vehicle database or an adviser to find various points of interest (POI), which may be displayed on a navigation screen, relating to businesses and other places, and provide turn-by-turn instructions to the navigation system, which in conjunction with GPS directs the vehicle to those locations. Navigation systems of this type allow the driver to input an address, or other location identifying information, into the IVR system where the navigation system will then direct the driver to that location using roadway displays on the navigation screen and/or voice commands. Further, driver assistance systems can work independently or in conjunction with such navigation systems to assist the driver in finding certain locations or obtaining other information.

OnStar™ is one of the IVR systems referred to above that provides a wireless communications tool for so equipped vehicles that allows members that subscribe to the service to interact wirelessly with an adviser and receive by email various messages and information about their vehicle that has been telematically transmitted by the vehicle to an OnStar™ service center. The OnStar™ service center provides this wireless service in a manner that is well understood by those skilled in the art. Currently, an OnStar™ subscriber may elect to receive a monthly diagnostic and information report identifying certain vehicle conditions, such as engine and transmission diagnostics, emissions system diagnostics, air bag system diagnostics, stability control system diagnostics, oil life, cellular telephone minutes, etc. OnStar™ also offers a number of other features, including hands free calling, turn-by-turn navigation, automatic crash response, emergency services, crisis assist, remote door unlock, roadside assistance, remote horn and light activation, etc. These expanding features allow a subscriber to have more information about his or her vehicle and provide certain vehicle functions remotely.

If a vehicle driver is in an unfamiliar area and wishes to find a certain business or other place, the driver can use an IVR system to contact an adviser, or database, through the cellular telephone network, possibly using speech recognition software, and ask the adviser for information concerning the type of business that the driver is attempting to locate. If the driver asks for a specific business, the adviser can search for that business, and provide directions to the location of the business, which may be telematically downloaded to the vehicle's navigation system. However, if the driver asks the adviser for general information about certain businesses, or other things, the adviser can do a general Internet search to find if such businesses exist in that area, but typically cannot provide any details about those businesses. Not only will the adviser typically not be able to give any information as to whether the business is open, how it is rated, if it has suitable parking, cost, etc., if the specific type of business is not near the location that the operator is asking for, the adviser typically will just state that none exist in that area, and not provide other options.

Navigation and driver assistance systems of the types discussed above would benefit by including a database that provided more information about specific businesses and locations, and was able to give a vehicle driver alternatives to those that were requested.

SUMMARY OF THE INVENTION

In accordance with the teachings of the present invention, a neighborhood guide system, related method and associated database are disclosed for providing information about businesses and other locations to a user, such as a vehicle driver, in a more natural and informative manner than traditional IVR systems. When interacting with the user, the neighborhood guide system typically will only provide choices for the user to select from based on a user request that are in the particular vicinity of the user. Further, the neighborhood guide system provides usable information about the selected business by the user, such as hours of operation, cost, ratings, parking, etc.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a neighborhood guide system is merely exemplary in nature, and is in no way intended to limit the invention or its applications or uses.

As will be discussed in detail below, the present invention proposes a neighborhood guide system, related method and associated database that may include a neighborhood guide interactive voice recognition (IVR) system that allow a vehicle driver, or other user, to communicate with a database through speech recognition software and/or with an actual advisor in a manner that allows the user to obtain real-world knowledge and decisions to support certain functionality to achieve increased naturalness and utility for the user concerning information about certain businesses and locations in the vicinity of the vehicle. In other words, the present invention proposes a neighborhood guide IVR system that gives the user more useable information about particular businesses or types of businesses than was previous available in the known IVR systems. The neighborhood guide IVR system is designed to operate as a real-world concierge that interacts with the user in a more intelligent manner than just providing selections to the user.

A significant portion of the discussion below has to do with a neighborhood guide interactive voice recognition system, particularly for a vehicle. However, as will be appreciated by those skilled in the art, the present invention has application for many different types of guide systems other than interactive voice recognition systems that may utilize the same database.

Figure 1:
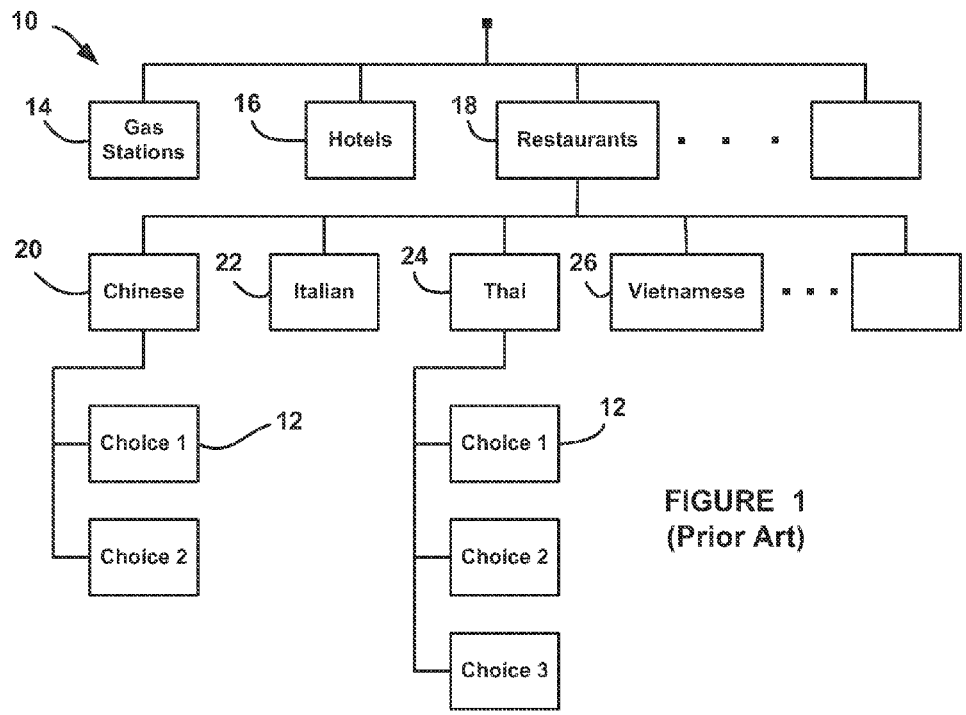
FIG. 1 is a block diagram of a hierarchical structure for a traditional interactive voice response system.

FIG. 1 is a block diagram of a hierarchical structure of a traditional or known IVR system 10 that allows a user to select from various businesses and other places, such as gas stations at box 14, hotels at box 16, restaurants at box 18, etc., provided at a top level of the structure of the system 10. The selections at the top level are always the same for a particular system regardless of whether the business is actually available in the vicinity of the vehicle or user. The user can select one of these categories, for example, restaurants, after which the IVR system 10 will go to a next level and provide selections for the category selected, for example, Chinese at box 20, Italian at box 22, Thai at box 24 and Vietnamese at box 26. Again, the selections at this level are always the same for the category selected for a particular system regardless of whether the business is actually available in the vicinity of the vehicle. If the user selects a particular restaurant, then the IVR system 10 may provide one or more choices at boxes 12 for that particular selection, which will be in the vicinity of the vehicle. However, the IVR system 10 will only identify that the choices for a particular selection are not available after the user makes the selection. Also, the IVR system 10 may not be able to provide any details about the choice, such as whether it is open, how it is rated, cost, etc.

Figure 2:
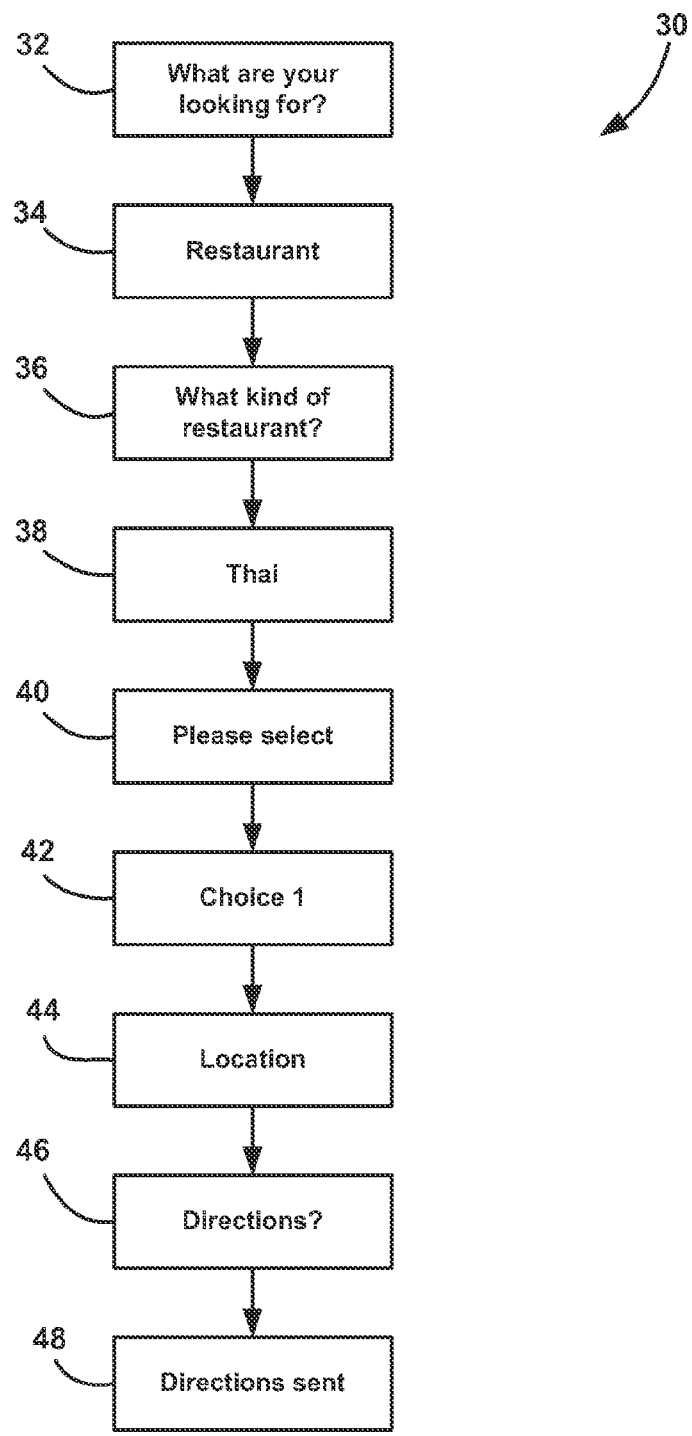
FIG. 2 is a flow diagram showing an example of a typical interaction between an adviser, or database, and a vehicle driver for the traditional interactive voice response system shown in FIG. 1.

FIG. 2 is a flow chart diagram 30 showing an example of an exchange between a user and the known IVR system 10 that may take place based on the hierarchical structure of the system 10. As discussed above, the interaction with the user and the IVR system 10 may be through a database using speech recognition software or an actual human adviser or a hybrid of both. At box 32, the known IVR system 10 may ask the user the type of place they are looking for, which can be selected from the pre-set places at the top level of the hierarchical structure of the system 10. The user may then respond or select restaurant at box 34, and the IVR system 10 may ask what type of restaurant at box 36 for the next level of the hierarchical structure of the system 10. As mentioned, the particular vicinity, or neighborhood, that the vehicle is in may not include all of the different types of restaurants provided for selection, but the known IVR system 10 will still offer them as a selection for the user. At box 38, the user may select Thai restaurant, where the IVR system 10 may respond with choices for the various Thai restaurants that are available in that vicinity at box 40. The user then can make a choice at box 42 from the list, after which the IVR system 10 will identify the location of that choice at box 44 and ask the user if they need directions at box 46, which are provided to the vehicle at box 48.

This operation and hierarchy of the traditional IVR system 10 has a number of disadvantages, such as providing choices for businesses that are not available in the neighborhood that the vehicle is currently in. Thus, if a business is not available in the particular area, the system 10 still provides it as an option. As a result, when a driver wishes to locate a nearby restaurant or other business, there is a high amount of interactions and long verbal outputs that makes the experience slow, tedious and unnatural. In addition, many IVR systems do not allow the user to exit the flow at intermediate points, which further degrades achievability. Thus, the hierarchical structure of the traditional IVR system 10 may require that the user go through levels of decisions that aren't applicable to a particular business that the user may be looking for. If the user asks for a particular service or general category, then the response of the IVR system 10 may be that there is none at that location, which the IVR system 10 provided as an option initially.

Further, a certain type of restaurant, for example, may not be on the standard list provided, but it may be a restaurant that the user is interested in. Further, when the selections are provided, the traditional IVR system 10 does not provide any details about the particular selections that may help the user choose, such as its rating, whether it's open, available parking, cost, etc.

Figure 3:
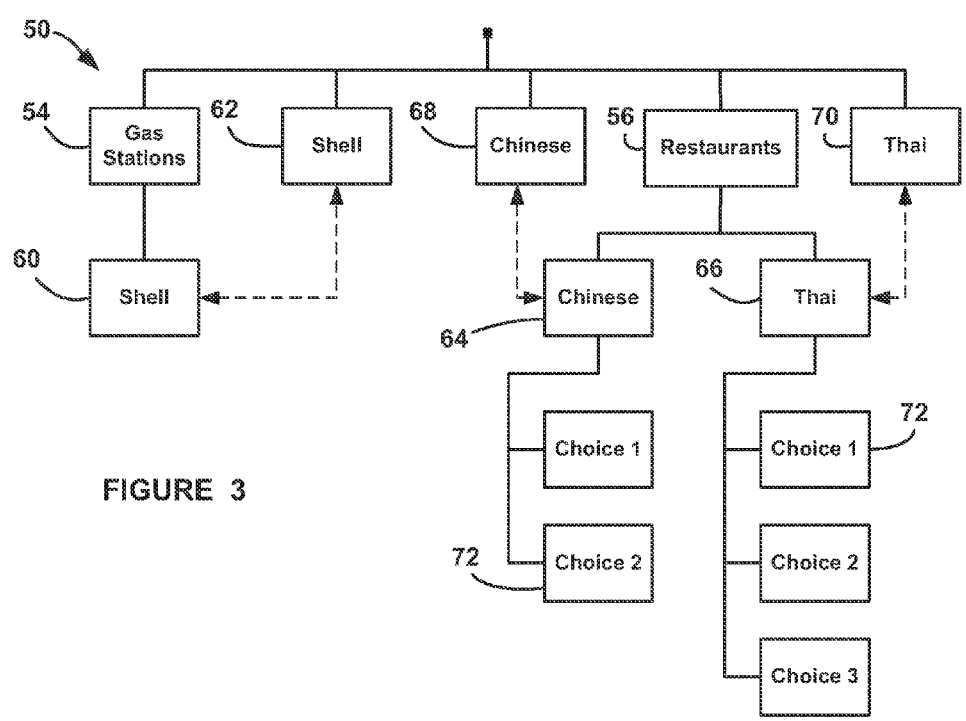
FIG. 3 is a block diagram of a hierarchical structure for a neighborhood guide interactive voice response system of the invention.

FIG. 3 is a block diagram of a hierarchical structure of a neighborhood guide IVR system 50 of the invention. The top level of choices that the user can select from are not the same for all locations that the vehicle may be in as was the case in the traditional IVR system 10, but are the general representation for the businesses, such as gas stations at box 54 and restaurants at box 56, which the system 50 only displays if they are available in the vicinity of the vehicle. Thus, things that are not available, such as hotels, theaters, etc., are not given as choices for the user. Further, depending on the number of selections for the particular category, those choices may also be provided at the top level of the hierarchical structure of the system 50. For example, if under gas stations there is only a single Shell™ station, represented at box 60, then the Shell™ station may be displayed on the top level of choices in the hierarchical structure of the system 50 at box 62. Likewise, if there are only Chinese restaurants, represented at box 64, under restaurants or Thai restaurants, represented at box 66, under restaurants, then those selections of restaurants may be placed in the top level of the hierarchical structure of the system 50, represented as boxes 68 and 70, respectively. Choice boxes 72 are provided under the Chinese restaurant box 64 and the Thai restaurant box 66 because there is more than one choice for those particular restaurants.

Figures 4, 5:
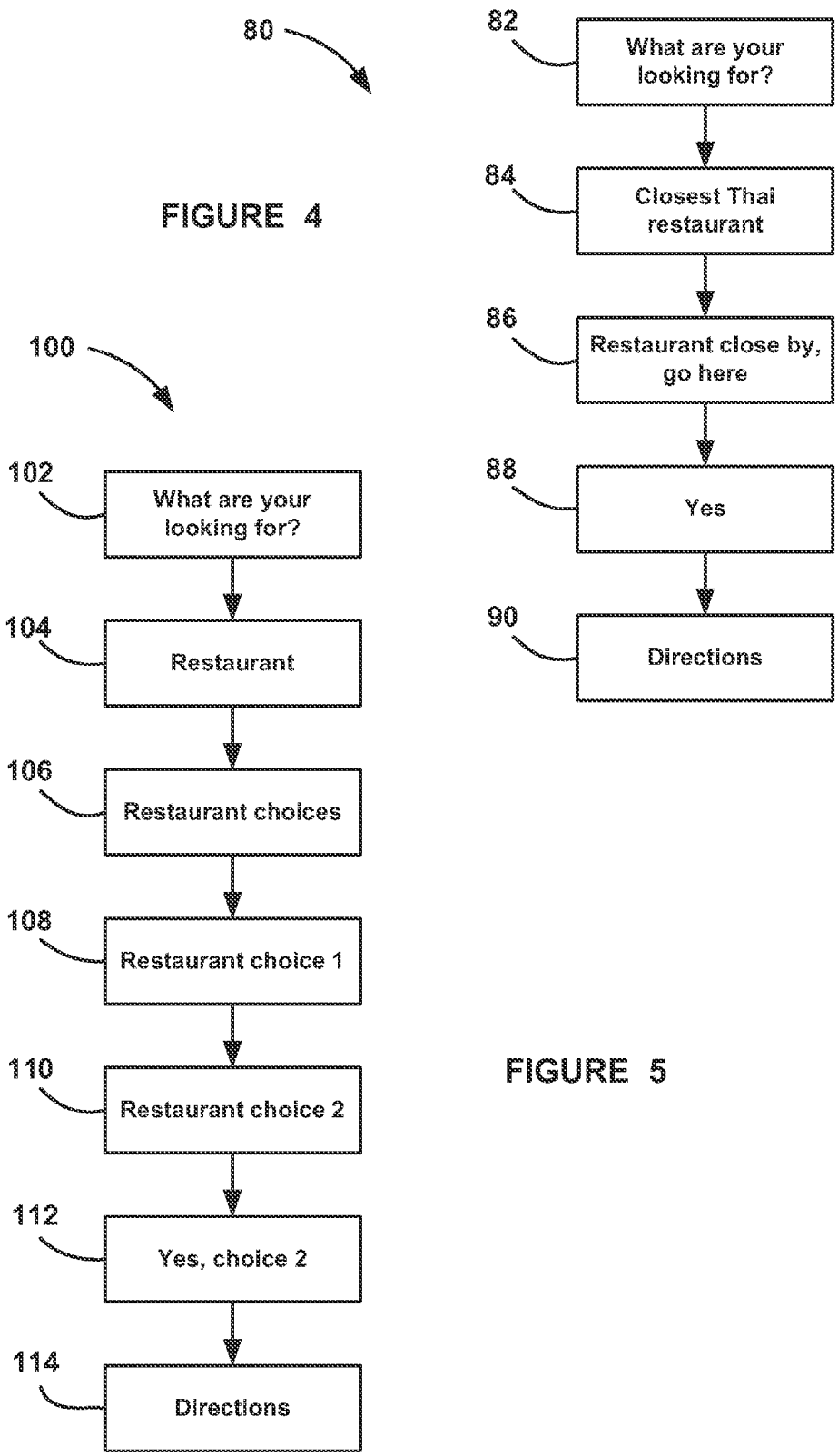
FIG. 4 is a flow diagram showing an example of a typical interaction between an adviser, or database, and a vehicle driver for the neighborhood guide interactive voice response system shown in FIG. 3.
FIG. 5 is a flow diagram showing another example of a typical interaction between an adviser, or database, and a vehicle driver for the neighborhood guide interactive voice response system shown in FIG. 3.

FIG. 4 is a flow chart diagram 80 showing an example of an exchange between the user and the neighborhood guide IVR system 50 that may take place based on the hierarchical structure of the system 50. At box 82, the neighborhood guide IVR system 50 may ask the user what they are looking for, and based on the database that's available for the neighborhood guide IVR system 50, the user can ask, for example, for the closest Thai restaurant at box 84 instead of having to pick from a restaurant list as in the traditional IVR system 10. At box 86, the neighborhood guide IVR system 50 may respond to the user's request by stating that there is Bow Thai restaurant a half mile away that is currently open and is highly rated, information that was not available in the traditional IVR system 10. The neighborhood guide IVR system 50 may then ask if the user wants to go to that restaurant at box 88, and provide directions at box 90 if so.

FIG. 5 is a flow chart diagram 100 showing another example of an exchange between the user and the neighborhood guide IVR system 50 that may take place based on the hierarchical structure of the system 50. Again, at box 102, the neighborhood guide IVR system 50 may ask the user what he is looking for, to which the user may respond "a restaurant" at box 104. Using the neighborhood guide IVR system database, the IVR system 50 can provide information about restaurants generally in that particular area. For example, the system 50 may state that there are many Thai restaurants, and Bow Thai is expensive, but highly rated and currently open at box 106. The system 50 may ask the user if they want to go to the Bow Thai restaurant, which the user may ask if there is there a cheaper Thai restaurant at box 108. The system 50 may respond with a second choice that is less expensive than Bow Thai at box 110, and ask the user if they want to go to that restaurant. The user may respond that he does at box 112, where the system 50 will then provide directions to that restaurant at box 114.

Thus, based on these examples, the neighborhood guide IVR system 50 is able to provide responses to specific inquires at a top level of the selection process, or can go through a more detailed and natural exchange with the user to provide more general information that the user is more able to effectively use. Also, the user may ask for a specific thing, such as the closest Thai restaurant as the example given above, and if no Thai restaurants are available in that particular area, the neighborhood guide IVR system 50 will so indicate, and could provide other, possibly related, options for other restaurants that may be in that area.

Based on the discussion above, the neighborhood guide IVR system 50 provides a number of advantages over the traditional IVR system 10, such as more natural interaction with the user where the system 50 will avoid (as much as possible) the requirements to memorize long lists of commands, the system 50 will not (through the use of mixed-initiative dialogue) require as many steps to reach a goal as in the traditional menu-driven IVR hierarchy, and the system 50 will recognize a wide variety of phrases that the typical user would find natural to say at a given dialogue turn, thus providing a level of flexibility that feels like continuous speech dictation, without the overhead and drawbacks of dictation systems.

The neighborhood guide IVR system 50 will deliver greater utility than the known IVR system 10, defined as a ratio of the information value gained and the effort required on the user's part to obtain that information. The metrics for utility may include the accuracy, relevance and depth of information about a particular location, which may include the time or number of steps/commands required to reach a goal as compared to interactions with a human agent or virtual assistant with a traditional hierarchical menu system. Further, the context relevance of the information will bear strongly on its utility by informing the user whether the business is currently open, whether it fits the user's preferences, if there is a suggested place to park nearby, etc.

The neighborhood guide IVR system 50 will provide decision support for the user to decide between alternatives rather than merely helping the user find a place already decided upon or simply the closest place that falls within a certain category. Certain criteria, such as cost, rating, hours, etc, would be offered to support the user's decision. Also, the focus of the experience with the IVR system 50 will be about discovering a desirable place to go, rather than to merely navigate to a pre-decided location.

The neighborhood guide IVR system 50 would be reflective of practical real-world knowledge and should reflect the most essential elements of information needed by most users to make a decision about where they want to go within a neighborhood. This should be reflected by the types of categories or conversational structure provided by the system 50 in order to optimize the interactions. A set of heuristic rules that are customary to most people for making practical decisions would be provided.

The invention discussed herein also includes generating the database necessary to interact with the user as being described. The discussion above concerns a neighborhood guide IVR system, but, as mentioned, the IVR system is just one example of the type of system that the neighborhood guide system of the invention could be used in. Other non-vehicular examples for the neighborhood guide system of the invention can also be provided. The database generated for the neighborhood guide system, discussed in more detail below, will have application for both IVR and non-IVR systems.

For non-human advisors, command and control speech recognition can be used as an input and synthesized and/or pre-recorded speech can be used as the output. Any suitable speech recognition engine can be employed for the purpose as discussed herein keeping in mind an unconstrained, larger vocabulary yields lower accuracy, user training and quiet environment is important for good results, many words are predicted rather than specifically recognized, and recognition errors and/or word predictions can completely change the meaning. For command and control, smaller vocabulary greatly improves accuracy and response time. Schematically-generated grammars provide natural-language variations, and error constraint to grammar and contextually-relevant terms can be provided for better error correction.

When generating the database, content pertaining to businesses and points of interest should go beyond their name, category and location to include things such as hours, suggested parking, price range, etc. The content will be aggregated, unitized and normalized from a variety of online sources. The sources may be of two or more types: other aggregators and the home pages of specific businesses. In production, the aggregation process will need to be done off-line prior to run time. The content in the database should be updated regularly to guarantee a certain level of freshness. The scope of functionality and content in the database needs to broad enough to represent a substantial increase in access to information and/or knowledge compared to the known database systems. The neighborhood guide system database should be coherent in that it should have a consistent user experience across its various functions, rather than combining different paradigms. At a high level, the neighborhood guide IVR system 50 will be consistent with other top-level menu items within a virtual adviser where it should have an initial entry point and introductory messages that fit with the user experience of other top-level items in the virtual advisor. After the initial entry point and introduction, the neighborhood guide IVR system 50 may shift naturally in its user experience paradigm from that of other virtual assistant applications, provided that the shift is for the sake of increased ease-of-use and intelligence.

Figure 6:
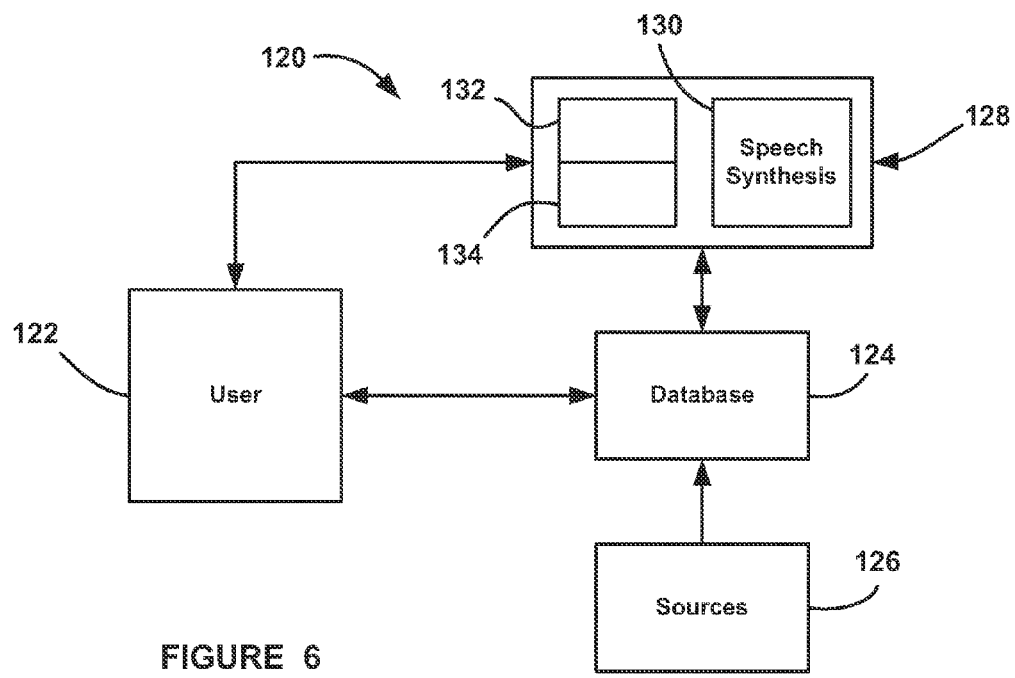
FIG. 6 is a general block diagram of a neighborhood guide interactive voice response system.

FIG. 6 is block diagram showing a general depiction of a neighborhood guide IVR system 120 of the type discussed above. Box 122 represents the user of the system 120 where commands and information are wirelessly transmitted between the user 122 and the system 120 itself. Box 124 represents an IVR system database, which would include the various servers and control modules necessary, as well as the personnel and advisers that may be required to communicate with the user 122. Information and data that is stored in the database 124 and is processed by the various algorithms therein to be used consistent with the discussion herein is provided by various sources 126, which can be any suitable source, such the Internet, libraries, phone books, ratings services, etc. The database 124 provides information to and receives information from a voice interface 128 that includes speech synthesis at box 130 and speech recognition at box 132, where the speech recognition 132 includes command grammar at box 134.

Figure 7:
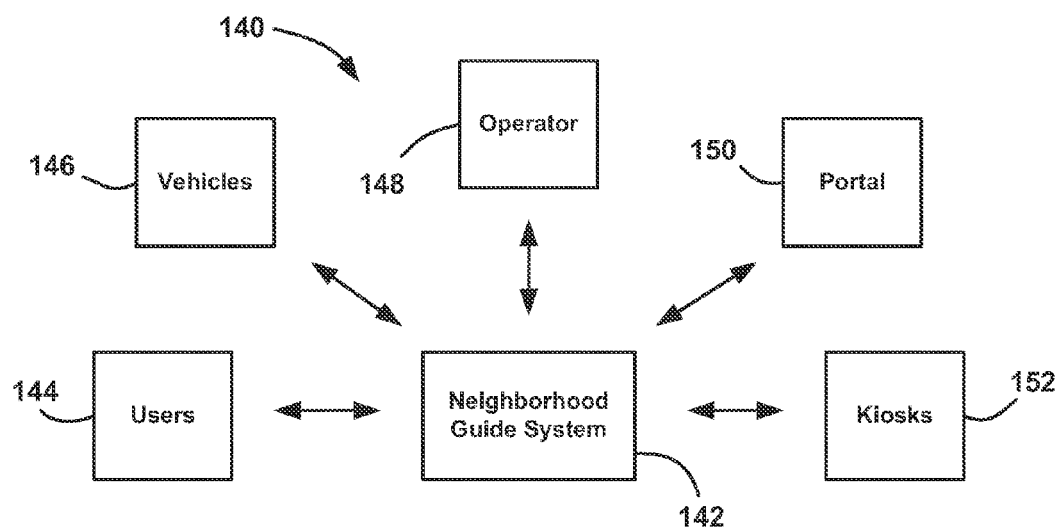
FIG. 7 is an illustration of the neighborhood guide interactive voice response system interacting with various entities.

FIG. 7 is an illustration 140 showing what entities a neighborhood guide system 142 of the type discussed above can interact with, vehicles and otherwise, in the manner discussed herein. Particularly, although the discussion above was specific for interacting with a vehicle driver, the neighborhood guide system 142 will have application for other users. For example, those users include mobile phones, tablet PCs, etc. at box 144, vehicles at box 146, an Onstar™ operator at box 148, an Onstar™ customer web portal at box 150 and dealership kiosks at box 152.

As discussed above, the neighborhood guide system 142 is a decision support system that models the tasks that a typical concierge at a hotel might make in helping travelers find desirable destinations for business or pleasure within a given neighborhood. Based on this fundamental, the neighborhood guide system 142 will employ multi-criteria decision analysis where a task is defined as seeking of a decision having multiple criteria that may conflict or may be impossible to satisfy all at once. It is known that with the average consumer, a greater variety of choices results in poor decision making, and sometimes analysis paralysis. Thus, a narrowing down of the choices for the user is needed. An analytical hierarchy process is used to manage both the multi-criteria decision analysis (MCDA) challenge and the paradox of choice by narrowing down the field of options interactively until one destination can be chosen.

The neighborhood guide system 142 uses a stochastic optimization and a non-monotonic approach to an analytic hierarchy process that more closely resembles how a concierge performs similar functions in the real world. Stochastic optimization can be defined where a guide, human or virtual, knows nothing of an individual's preferences, and starts by providing random choices. By tweaking the concierge's suggestion in one aspect or another, a satisfactory result may be found much faster than by doing an exhaustive drill-down of all of the conceivable parameters of choice. For non-monotonic reasoning, a guide reaches a tentative set of criteria, but cannot find the perfect match. The guide may need to retract one of the selection criteria in order to explore the decision space farther.

The full version of the neighborhood guide system 142 would utilize computer reasoning to learn, over time, what a particular user is more likely to be interested in. Case-based reasoning involves learning from past sessions with the same user according to a process of comparing the current cases to the old cases. In a retrieve, re-use, revise and retain case-based reasoning approach, the system first retrieves a similar case, then re-uses that historical case to the current case, then revises the search according to any corrective feedback, and retains any relevant information. The newly retrained case definition will increase the odds that the system makes a better initial recommendation in future sessions. Further, the neighborhood guide system 142 can be personalized to a user's particular preferences by logging into a web site.

The database can be generated by a combination of third-party repositories and home pages of specific businesses. For those businesses where some desired data is not available, it is necessary to insure a confident response to the user where the system 142 will privilege businesses for which better data is known. The database generation can include a combination of web-crawling, data-modeling, syntactic parsing and schematic analysis in order to extract normalized data, such as cuisine type of a restaurant, hours of operation of a business, the location of a parking lot, etc. For most information sources, it will be required to model the page structure with document object modeling (DOM) and to unitize and normalize the information there, which in many cases will be expressed in an unstructured or poorly structured manner. A schematic networking ontology can be utilized to map extracted data to an ever-growing knowledge base. A soft ontology approach can be used to absorb the ontological relativity of individuals having different ways of classifying things.

Schematics and text mining can be used to extract only pertinent information from structured databases and unstructured information, such as free-form text, such as web pages, and normalize and associate the data with each point of interest, and generate appropriate grammars for interacting with the system. Decision support technologies will be required to enable the system to guide the user to a selection that best fits their desires within a local area in a quick and efficient manner. Machine reasoning will add automatic personalization so that the system 142 can learn the preferences of the customer based on historical usage as well as direct guidance.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing a multi-criteria decision analysis database that uses a stochastic, non-monotonic analytic hierarchy process model for reducing a decision space around a selection of points of interest within a domain, said method comprising:
ranking and weighting the points of interest prior to a run-time;
measuring instance densities around criteria during or just before the run-time so that at least one sufficiently dense cluster of instances around at least one sufficiently weighted criteria is found and is suggested to a user; and
providing the criteria to the user for revisions.

2. The method according to claim 1 wherein the database is modified according to explicit preferences set by the user.

3. The method according to claim 2 wherein the database is modified based on inferences derived from user behavior.

4. The method according to claim 3 wherein the user behavior is selected from the group consisting of inferences based on case-based reasoning, collaborative filtering and relevant machine learning methodologies.

5. The method according to claim 1 further comprising building a hierarchical tree of steps that will be traversed during a dialogue between the user and the database to obtain possible supplementary information about the points of interest.

6. The method according to claim 1 further comprising supporting inferring of follow-up questions by the system.

7. The method according to claim 1 wherein the method is used in an interactive voice response system associated with a navigation system for a vehicle.

8. A method for providing a user with information about businesses in a predetermined localized area, said method comprising:
   identifying businesses on a display screen that are only available in the predetermined area;
   asking the user what the user is looking for;
   providing the user with detailed information about a particular business based on a request from the user;
   providing directions to a business selected by the user; and
   employing a database that provides the user with the detailed information where the database ranks and weights points of interest prior to a run-time, measures instance densities around criteria during or just before the run-time so that at least one sufficient dense cluster of instances around at least one sufficiently weighted criteria is found and is suggested to the user and provides the criteria to the user for revisions.

9. The method according to claim 8 wherein the method is employed in a vehicle driver assistance and/or vehicle navigation system.

10. The method according to claim 8 wherein providing information about a business includes identifying whether the business is open, identifying a rating of the business, identifying a cost of goods provided by the business and identifying whether there is available parking at the business.

11. The method according to claim 8 wherein the system learns about user preferences through interaction with the user.

12. The method according to claim 8 wherein the database employs speech recognition software.

13. The method according to claim 8 wherein the database is modified based on inferences derived from user behavior.

14. The method according to claim 8 wherein the database is modified according to explicit preferences set by the user.

15. The method according to claim 8 wherein the database employs building a hierarchical tree of steps that will be traversed during a dialog between the user and the database to obtain possible supplementary information about the points of interest.

16. The method according to claim 8 wherein user behavior is selected from the group consisting of inferences based on case-reasoning, collaborative filtering and relative machine learning methodologies.

17. A neighborhood guide system comprising:
   an entity desiring to receive information about places in a particular neighborhood; and
   a database operable to provide the information to the entity, said database ranking and weighting points of interest prior to a run-time, measuring instance densities around criteria during or just before the run-time so that at least one sufficiently dense cluster of instances around at least one sufficiently weighted criteria is found and suggested to the entity and provides the criteria to the entity for revisions.

18. The system according to claim 17 wherein the entity is selected from the group consisting of mobile phones, tablet PCs, vehicles, web portals and dealership kiosks.

19. The system according to claim 17 wherein the neighborhood guide system is part of a vehicle driver assistance and/or navigation system.

* * * * *